United States Patent [19]

Loh et al.

[11] Patent Number: 5,193,618

[45] Date of Patent: Mar. 16, 1993

[54] MULTIVALENT ION TOLERANT STEAM-FOAMING SURFACTANT COMPOSITION FOR USE IN ENHANCED OIL RECOVERY OPERATIONS

[75] Inventors: William Loh; Rawls H. Frazier, Jr., both of Petaluma, Calif.

[73] Assignee: Chevron Research and Technology Company, San Francisco, Calif.

[21] Appl. No.: 758,556

[22] Filed: Sep. 12, 1991

[51] Int. Cl.$^5$ .................... E21B 43/22; E21B 43/24
[52] U.S. Cl. ............................. 166/272; 166/273; 166/294; 166/303; 166/309; 252/8.554
[58] Field of Search ............... 166/272, 273, 274, 294, 166/303, 309; 252/8.554

[56] References Cited

U.S. PATENT DOCUMENTS

| | | | |
|---|---|---|---|
| 4,556,107 | 12/1985 | Duerksen et al. | 166/309 X |
| 4,576,232 | 3/1986 | Duerksen et al. | 166/309 X |
| 4,607,700 | 8/1986 | Duerksen et al. | 166/309 X |
| 4,643,256 | 2/1987 | Dilgren et al. | 166/303 |
| 4,682,653 | 7/1987 | Angstadt | 166/303 |
| 4,820,429 | 4/1989 | Lim | 252/8.554 |
| 4,860,828 | 8/1989 | Oswald et al. | 166/268 X |
| 5,000,262 | 3/1991 | Danzik | 166/309 X |
| 5,005,644 | 4/1991 | Wall et al. | 166/309 X |

FOREIGN PATENT DOCUMENTS 1247850 1/1989 Canada .

OTHER PUBLICATIONS

SPE/DOE 17361, "Surfactants for Mobility Control in High-Temperature Steam-Foam Applications" by H. M. Muijs et al, 1988.

Primary Examiner—George A. Suchfield
Attorney, Agent, or Firm—Burns, Doane, Swecker & Mathis

[57] ABSTRACT

A method for recovering hydrocarbons from a reservoir during gas injection into the reservoir comprises at least periodically injecting a gas comprising steam and a foam-forming composition which includes at least one steam foam diversion surfactant into a reservoir which contains at least one multivalent cation. The foam forming composition comprises water, an effective foam-forming amount of the surfactant which preferably comprises an alkyl aromatic sulfonate and a precipitation control additive. This precipitation-control additive preferably comprises an alpha-olefin sulfonate dimer (AOSD). The method further comprises contacting the hydrocarbons in the resevoir with the foam and the gas so as to assist in the recovery of hydrocarbons from the reservoir.

20 Claims, No Drawings

MULTIVALENT ION TOLERANT STEAM-FOAMING SURFACTANT COMPOSITION FOR USE IN ENHANCED OIL RECOVERY OPERATIONS

BACKGROUND OF THE INVENTION

The present invention relates to the method for enhancing the recovery of petroleum from an oil bearing formation.

In the recovery of oil from reservoirs, the use of primary production techniques (i.e., the use of only the initial formation energy to recover the crude oil) followed by the secondary technique of water flooding, recovers only a portion of the original oil present in the formation.

Moreover, the use of certain enhanced oil recovery (EOR) techniques are also known in the art. These techniques can generally be classified as either a thermally based recovery technique, e.g., utilizing steam, or a gas drive method that can be operated in a miscible or non-miscible manner.

Methods which employ steam are effective in the enhanced recovery of oil because the steam heats the formation, lowers the viscosity of the oil and thus, enhances the flow of the oil towards a production well. Moreover, these methods have become preferred methods for enhanced oil recovery of low gravity, high viscosity oils, because steam can cost effectively provide heat to such oils.

However, in these steam based techniques, it is common that the steam will find short-cut pathways from the injection well to some of the producing wells, thus bypassing oil which is present in the zone between the injection well and the production well. Also, after the initial steam injection breakthrough at the production well, the steam injection preferentially follows the path of the breakthrough. These pathways can take the form of channels in the formation or of gravity override in the upper portion of the oil bearing stratum. Gravity override results from the lower density and viscosity of the steam vapor compared to the liquid oil and water. Thus, the total amount of the formation that is swept by the steam injection is limited.

Various methods have been proposed to mitigate the loss of steam flow and heating value in the formation. For example, a number of commercial surfactants have been injected along with the steam to create a steam-foam flood. The foam serves to physically block the volumes through which the steam is shortcutting and divert the flow of the steam into the unswept portion of the formation.

In addition, various inert and non-condensable gases have been added to the steam, both in the presence and absence of foaming surfactants in order to enhance and maintain the oil-driving force with the formulation.

Examples of the steam-foam processes can be found in U.S. Pat. Nos. 4,086,964; 4,445,573; 4,393,937; 4,161,217; and 4,085,800.

In particular, certain alkyl aromatic sulfonates have been employed as a surfactant with the steam-foam drive systems. See, for example, Canadian Patent 1,247,850.

In such recovery operations maintaining the surfactant in a state suitable for foam generation is important. In particular, precipitation, phase separation and the like are detrimental to producing a useable foam. For example, although many aqueous surfactant systems, such as those employing alkyl aromatic sulfonates, are generally considered adequate foamers, they also have a relatively low tolerance to multivalent cations. Such cations, and in particular divalent cations, e.g., calcium or magnesium salts, or the like, are commonly encountered in waters or brines in subterranean reservoirs. The multivalent cations tend to react with anionic surfactants or the components of anionic surfactant systems to form precipitates, to cause phase separations, or the like and severely inhibit foam formation.

A variety of solutions have been offered in an attempt to solve the multivalent cation intolerance problems associated with such surfactant systems. See for example, U.S. Pat. No. 4,820,429 which employs a surfactant such as alkylated diphenyl oxide surfactants; as well as U.S. Pat. No. 4,643,256 which involved the use of an alkylpolyalkoxyalkylene or alkylarylpolyalkoxyalkylene sulfonate surfactant.

However, the need still exists for a composition which is capable of preventing the undesirable precipitation of alkyl aromatic sulfonates, in particular $C_{20}$-$C_{24}$ linear alkyl aromatic sulfonates and which has adequate thermal stability so as to be employed at the relatively high temperatures, e.g., 400°-600° C. which can be associated with enhanced recovery operations.

SUMMARY OF THE INVENTION

Among other factors, the present invention is based upon a surprising discovery that the use of certain precipitation control agents can effectively prevent the undesirable precipitation of steam foam diversion surfactants while at the same time providing adequate thermal stability.

In particular, the present invention relates to a method for recovering hydrocarbons from a reservoir during gas injection into the reservoir. This method comprises at least periodically injecting a gas comprising steam and a composition including at least one steam foam diversion surfactant, into a reservoir which contains at least one multivalent cation so as to provide a foam. This composition comprises water, an effective foam forming amount of the surfactant which preferably comprises an alkyl aromatic sulfonate, and a precipitation-control additive. This preferred alkyl aromatic sulfonate has an average molecular weight of about 400 to about 600 and at least one alkyl group comprising 16-40 carbon atoms while the precipitation control additive comprises an α-olefin sulfonate dimer. The method further comprises contacting the hydrocarbons in the reservoir with the foam and a gas so as to assist in the recovery of the hydrocarbons from the reservoir.

DETAILED DESCRIPTION OF THE PREFERRED EMBODIMENTS

The present invention relates to a method for enhancing the recovery of petroleum from oil bearing formations which contains at least one multivalent cation, e.g., $Ca^{2+}$, $Mg^{2+}$. The method utilizes a foam forming composition which can be effectively employed with steam. In particular, this composition comprises water, at least one surfactant, and a precipitation control additive which is present in an amount effective to prevent the undesirable precipitation of the surfactant.

The foam-forming composition can be employed within a formation which contains at least one multivalent cation, e.g., at least one divalent cation such as calcium or magnesium.

The surfactants include any of those steam foam diversion surfactants recognized in the art, such as alpha-olefin sulfonates and alkyl aromatic sulfonates, with alkyl aromatic sulfonate surfactants being preferred.

The alkyl aromatic sulfonates preferably employed in this invention have average molecular weights of from 400 to about 600, more preferably about 450 to about 550 and still more preferably about 475 to about 525 based on sodium salts.

The alkyl aromatic sulfonate employed within the present invention includes alkyl aromatic sulfonates where at least one of the alkyl groups which comprises 16-40 carbon atoms, preferably 20-30 carbon atoms and more preferably 20-24 carbon atoms.

The preferred alkyl group is a linear alkyl group which is derived from a linear alpha olefin such as those sold by Chevron Chemical Company, San Francisco, Calif.

By "linear alkyl group" is meant an alkyl group having mostly secondary carbon atoms ($-CH_2-$). The linear alkyl group can also have some additional branching. However, the degree of branching is such that the linear alkyl group is a substantially straight chain, that is, greater than 80 number percent of the individual carbon atoms in the alkyl substituent are either primary ($CH_3-$) or secondary ($-CH_2-$) carbon atoms, preferably, greater than 85 percent.

Examples of linear alkyl groups useful in this invention include:
- n-octadecyl
- n-nonadecyl
- n-icosyl
- n-henicosyl
- n-docosyl
- n-tricosyl
- n-tetracosyl The alkyl group employed can also be a branched alkyl group.

By "branched alkyl group" is meant an alkyl group having at least one branch of 1 (methyl), 2 (ethyl) or more carbon atoms for every 3 carbon atoms along the longest chain or the alkyl group. Thus, in preferred branched alkyl groups, the number of carbon atoms in the longest chain is divided by 3 (rounded down to the whole number) and there will be at least this number of branches in the chain. Branched alkyl group useful in this invention may be more or less branched than the preferred. For example, the branching may average as much as every 2 or 2.5 backbone carbons or as little as one branch every 3.5 or 4 backbone carbons.

Examples of the branched alkyl groups useful in the invention include those derived from propylene and butylene polymerization such as tetramers, and higher molecular weight oligomers.

The alkyl aromatic sulfonates useful in this invention may be relatively pure compounds or mixtures of compounds. Mixtures of compounds are preferred.

The aromatic component of the alkyl aromatic sulfonate preferably comprises benzene, ethyl benzene, toluene, xylene, cumene and naphthalene. Alkylation of the aromatic moiety provides the alkyl aromatic component with the preferred alkylation catalysts being acid catalysts. The composition of the alkyl aromatic sulfonates depends on the composition of the alkylating agent. Useful alkylating agents include alkyl halides and olefins; olefins are preferred.

The starting olefins used to alkylate the aromatic moiety may have a single carbon number or may be a mixture of carbon numbers.

Often, mixtures of olefin isomers are used to alkylate the aromatic moiety. Typically, commercially available alpha olefins are mixture of isomers which include alpha olefins, vinylidene olefins and internal olefins.

The sulfonate component can be present either in a water-soluble salt form comprising preferably sodium, potassium, ammonium or alkyl ammonium, or can be present in an acid form.

The foam forming composition employed within the present invention also includes at least one precipitation-control additive in an amount effective to prevent the undesirable precipitation of the surfactant during the use thereof.

The precipitation-control additive (PCA) comprises $\alpha$-olefin sulfonate dimers (AOSD). The PCA can be, for example, 100% AOSD or can be an aqueous solution, e.g., a 40% aqueous solution of AOSD. The amount of PCA added is dependent on the amount of, e.g., $Ca^{2+}$ ion present in the formation. For example, in an environment containing calcium cations in a concentration of about 60 to about 200 ppm, the PCA is present in an amount such that the ratio of the surfactant, e.g., alkyl aromatic sulfonate, to the AOSD is not greater than about 5:1, and is preferably from about 5:1 to about 5:3, with about 10:3 to about 5:2 being more preferred.

The precipitation control additive can be prepared by methods known in the art. For example, suitable $\alpha$-olefin sulfonate dimers are those exemplified in U.S. Pat. No. 3,721,707 which is incorporated herein by reference.

Because of the high thermal stability associated with AOSD, the PCA according to the present invention can be effective in many, if not all, oil field environments. For example, it can be employed in temperatures as high as 400° C.

The foam-forming composition can be a 100% active, i.e., composed solely of active components, or can be a dilute solution, i.e., where the surfactant is present in an amount as low as about 0.1% by weight. However, the foam-forming composition is preferably formed as a concentrate comprising an admixture of surfactant and water. In one example of a concentrate, the alkyl aromatic sulfonate is present in an amount of about 5 to about 20% by weight, preferably about 8 to about 12% by weight with 9 to about 11% by weight being most preferred.

In use, the concentrate is preferably diluted with additional water to a working strength of about 0.05 to about 5 weight % surfactants, more preferably about 0.1% to about 1 weight % surfactants based on the total weight.

Any known method for providing a concentrate admixture of water and surfactant can be employed. For example, the water can be mixed with 50% sodium hydroxide and a nonionic dispersant. This mixture is mixed and heated to a temperature of, for example, about 70° C. while an alkyl aromatic sulfonic acid is added to the mixture by any known means, for example, by being pumped into the mixture over a controlled period of time. The precipitation control additive is then added thereto.

The water which can be effectively employed in the present invention can include water from any natural source including brines.

Although water is a typical diluent, the choice of a particular diluent is based upon the requirements of the reservoir to be treated, economics, and compatibility of the composition upon dilution.

The steam that can be employed within the process of the present invention is that which is well known to be employed in the enhanced oil recovery art.

For example, in a steam drive oil recovery process, the liquid volume fraction or LVF is defined as the ratio of the volume occupied by the steam in the liquid phase to the total volume occupied by the liquid and vapor phases of the injected steam at down hole conditions.

By comparison, steam quality is defined as the weight percent of steam present in the vapor phase of the two phase (liquid+vapor) steam that is injected.

In steam based EOR processes, the quality of injected steam will generally vary from about 50 to about 80% with the typical range being about 60 to about 65%. Since the vapor phase occupies so much volume relative to the liquid phase, steam of 50 to 80% quality will result in a liquid volume fraction in the range of about 0.001 to about 0.005 or 0.1 to 0.5% by volume of a liquid of the injected steam. As the steam quality measures the weight quantity of the steam in the vapor phase, higher steam quality correspond to lower liquid volume fractions.

The steam employed within the present invention can also include a gas such as nitrogen, methane, flue gas, carbon dioxide, carbon monoxide, air, or mixtures thereof, in an amount of 0 to about 50% by volume.

Moreover, the water phase of the steam can include electrolytes such as silicates and sodium chloride in an amount of, for example, about 0.1 to about 5% by weight.

In using the mixture of the present invention for the enhanced recovery of petroleum products, the foam may either be preformed outside of the well or "in situ" (i.e., in the formation). In either method, any method which is well known in the art for injecting a foam into the formation may be employed.

The present invention can be effectively employed in all oil bearing formations. However, the steam based techniques are particularly preferred in the enhanced recovery of low gravity, high viscosity oil from sedimentary rock formations.

In particular, the steam-based recovery techniques which are preferably used in the present invention include both the cyclic and the steam drive methods. Each of these methods are well known in the art. See, for example, U.S. Pat. No. 5,000,262 as well as U.S. Pat. Nos. 3,945,437; 4,013,569; 4,393,937.

For example, in the cyclic method, the producing well may be the same well through which steam is periodically injected to stimulate petroleum flow from the reservoir (popularly called "huff and puff"). Alternatively, in the steam drive method, one or more producing wells may be spaced from the injection well so that the injected steam drives petroleum through the reservoir to at least one such producing well.

As an example of the present invention, a preformed foam is at least periodically injected into the formation. This periodic injection preferably involves the repeated injection of a slug of the foam into the well for a desired interval of time.

In one embodiment, the foam is preformed in the well tubing or formed on the surface, before the mix reaches the well. Preferably, such foam is preformed by introducing the foam-forming mixture and water into a stream of the steam flowing into the reservoir through the steam injection well tubing. This assures the foam production before injection into the producing formation.

The following examples illustrate advantages which can be associated with the present invention, which examples are understood to be illustrative and in nowise limitive.

EXAMPLES

Example 1

This example illustrates the effectiveness of the present invention in controlling precipitation of a steam foam diverting agent. In this example 100 ml of 0.5 wt % solution of alkyl aromatic sulfonate were prepared in a volumetric flask by the following sequence:

(1) An alkyl aromatic sulfonate was added to the volumetric flask and dissolved with a portion of the steam generator feed water (SGFW): 295 ppm NaCl, 11 ppm KCl, 334 NaHCO$_3$, and 61 ppm Na$_2$SO$_4$ to be added thereto.

(2) A desired amount, if any, of the AOSD was added thereto.

(3) A 10% Ca$^{2+}$ solution was diluted with part of SGFW, then added to the volumetric flask.

(4) The balance of the SGFW was added to provide a 100 ml of solution.

(5) The solution was allowed to stand overnight at room temperature and was then centrifuged at 7000 rpm for 15-20 minutes in a Beckman J2-21M centrifuge and the amount of solids present (as ppm by volume) was determined.

A typical sample preparation (Sample #5) is shown below. The components were mixed in the amounts listed to give the desired concentrations.

Six different surfactant systems were prepared and the results are summarized in Table 1.

Samples 1 and 2, which were formulations A and B respectively, were prepared as controls for surfactant systems containing C$_{20-24}$ LATS a linear alkyl toluene sulfonate having a chain length of 20-24 carbon atoms. Sample 1 contained 7000 ppm solids which were not identified, but considered as inert material intrinsic to the material. Sample 3 showed that the addition of 200 ppm Ca$^{++}$ to a Formulation A caused precipitation of the sulfonate as evidenced by an increase of 5000 ppm solids being formed. Sample 5 showed the sequestering effect of the addition of α-olefin sulfonate dimer as evidenced by a reduction of solids from 12000 ppm back to 6000 ppm solids, a reduction of 6000 ppm.

Sample 4 showed that the addition of 200 ppm Ca$^{++}$ to the Formulation B caused precipitation of the sulfonate as evidenced by an increase from 9000 ppm to 45000 ppm solids being formed. Sample 6 showed the sequestering effect of the addition of AOSD as evidenced by a reduction of solids from 45000 ppm back to 6000 ppm solids.

| | Sample #5 | |
|---|---|---|
| Solution | gm | Final Concentration Wt % |
| 9% C2024 LATS | 5.56 | 0.5 |
| 40% AOSD | 0.38 | 0.15 |
| 10% Ca$^{++}$ Soln | 0.20 | 200 ppm |
| SGFW | 93.86 | — |
| Total | 100 | — |

TABLE 1

| Sample | Formulation | Surfactant System | Solids After Centrifuging |
|---|---|---|---|
| 1 | A | 0.5% C2024 LATS | 7000 ppm |
| 2 | B | 0.5% C2024 LATS | 9000 ppm |
| 3 | A | 0.5% C2024 LATS 200 ppm $Ca^{++}$ | 12000 ppm |
| 4 | B | 0.5% C2024 LATS 200 ppm $Ca^{++}$ | 45000 ppm |
| 5 | A | 0.5% C2024 LATS 0.15% AOSD 200 ppm $Ca^{++}$ | 6000 ppm |
| 6 | B | 0.5% C2024 LATS 0.15% AOSD 200 ppm $Ca^{++}$ | 6000 ppm |

Example 2

This example illustrates the surprising effectiveness of precipitation control when the precipitation control agent is employed in the effective amounts discussed previously.

In particular, Table 2 illustrates the advantages which can be obtained when an effective precipitation control amount of alpha olefin sulfonate dimer is added to alkyl aromatic sulfonate to which a viscosity control amount of the AOSD has previously been added in accordance with U.S. Pat. No. 5,000,262, i.e., a surfactant composition comprising 0.5 weight % of $C_{20-24}$ linear alkyl toluene sulfonate contains 0.04 weight % of AOSD.

Each of the examples illustrates the precipitation formed when various amounts of AOSD are added to the surfactant system. As illustrated in Table 2, in an environment having a $Ca^{2+}$ ion concentration of 180 ppm, precipitation can be effectively controlled when a surfactant to AOSD ratio of not greater than 5.1 is employed.

TABLE 2

| Sample | $C_{20-24}$ LATS* | AOSD | $Ca^{++}$ (ppm) | Precipitation results |
|---|---|---|---|---|
| 1 | 0.5 | 0 | 180 | cloudy, with ppt after 24 hours |
| 2 | 0.5 | 0.05 | 180 | cloudy, slight ppt after 24 hours |
| 3 | 0.5 | 0.1 | 180 | faint haze |
| 4 | 0.5 | 0.15 | 180 | faint haze |
| 5 | 0.5 | 0.2 | 180 | faint haze |

*The $C_{20-24}$ LATS surfactant system, prepared in accordance with U.S. Pat. No. 5,000,262, contains 0.04% by weight AOSD.

While the invention have been described in terms of various preferred embodiments, the artisan will appreciate that various modifications, substitutions, omissions, and changes may be made without departing from the spirit thereof. Accordingly, it is intended that the scope of the present invention be limited solely by the scope of the following claims including equivalents thereof.

We claim:

1. A method for recovering hydrocarbons from a reservoir during gas injection into said reservoir comprising:
   at least periodically injecting gas comprising steam and a foam-forming composition including a steam foam diversion surfactant into the reservoir which contains at least one multivalent cation;
   wherein the composition comprises water, an effective foam forming amount of the steam foam diversion surfactant, and an effective sequestering amount of at least one precipitation control additive which comprises an α-olefin sulfonate dimer (AOSD),
   contacting the hydrocarbons in the reservoir with the foam and the gas so as to assist in the recovery of hydrocarbons from the reservoir.

2. The method of claim 1 where said steam foam diversion surfactant is an alkyl aromatic sulfonate having an average molecular weight of about 400 to about 600 and at least one alkyl group comprising 16–40 carbon atoms.

3. The method of claim 2 wherein the carbon content of the at least one alkyl group comprises 20–30 carbon atoms.

4. The method of claim 2 wherein the carbon content of the at least one alkyl group comprises 20–24 carbon atoms.

5. The method of claim 4 wherein the alkyl aromatic sulfonate, as its sodium salt, has an average molecular weight of about 475–525.

6. The method of claim 5 wherein at least one alkyl group is a linear alkyl group or a branched alkyl group.

7. The method according to claim 6 wherein the AOSD comprises 16–40 carbon atoms.

8. The method of claim 2 wherein the alkyl aromatic sulfonate, as its sodium salt, has an average molecular weight of about 450–550.

9. The method of claim 2 wherein the alkyl aromatic sulfonate, as its sodium salt, has an average molecular weight of about 475–525.

10. The method of claim 2 wherein the AOSD contains 16–40 carbon atoms.

11. The method according to claim 2 wherein the at least one multivalent cation includes calcium which is present in an amount from about 60 to about 200 ppm wherein the ratio of the surfactant to the at least one precipitation control additive is from about 5:1 to about 5:3.

12. The method according to claim 11 wherein the ratio of alkyl aromatic sulfonate to AOSD is about 10:3 to about 5:2.

13. The method according to claim 11 wherein the alkyl aromatic sulfonate is present in an amount of about 0.3–1.0% by weight of the composition and the precipitation-control agent is present in an amount of about of about 0.1–0.4% by weight of the mixture.

14. The method of claim 2 wherein the aromatic component of the alkyl aromatic sulfonate comprises benzene, ethyl benzene, toluene, xylene, cumene, and naphthalene.

15. The method of claim 14 wherein the sulfonate component of the alkyl aromatic sulfonate is in a water soluble salt form which comprises sodium, potassium, ammonium, or an alkyl ammonium.

16. The method of claim 14 wherein the sulfonate component of the alkyl aromatic sulfonate is in acid form.

17. The method of claim 2 wherein the at least one multivalent cation is at least one divalent cation.

18. The method of claim 17 wherein the at least one divalent cation is calcium and/or magnesium cations.

19. The method of claim 17 wherein the at least one cation is calcium.

20. The method of claim 2 wherein the gas further includes nitrogen, methane, flew gas, carbon dioxide, carbon monoxide, air, or mixture thereof.

* * * * *